Feb. 27, 1923.

R. M. SMYTHE 1,446,592

DISH DRAINER

Filed May 8, 1919

WITNESSES
Eugene A. Wilson
J. C. Ledbetter

INVENTOR
RICHARD M. SMYTHE
BY
ATTORNEYS

Patented Feb. 27, 1923.

1,446,592

UNITED STATES PATENT OFFICE.

RICHARD M. SMYTHE, OF BROOKLYN, NEW YORK, ASSIGNOR, BY MESNE ASSIGNMENTS, TO REX METAL PRODUCTS CO., INC., OF BROOKLYN, NEW YORK, A CORPORATION OF NEW YORK.

DISH DRAINER.

Application filed May 8, 1919. Serial No. 295,565.

*To all whom it may concern:*

Be it known that I, RICHARD M. SMYTHE, a citizen of the United States, and a resident of the city of New York, borough of Brooklyn, county of Kings, and State of New York, have invented a new and Improved Dish Drainer, of which the following is a full, clear, and exact description.

This invention relates to dish washing apparatus, and more particularly the invention relates to a dish drainer.

An object of the invention is to provide a dish drainer apparatus into which dishes may be placed and scalded prior to the drying thereof.

It is a broad object of this invention to provide a new and usefully improved form of dish drying rack which will find broad and effective use in kitchens, and in hotels, restaurants and dish drying institutions.

It is also an object of the present invention to provide a dish drainer apparatus having a removable drain or drip rack to facilitate washing and cleansing of the several parts.

Finally, it is an object to provide a simplified form of dish drainer or drying rack which will be comparatively inexpensive to manufacture, simple and efficient in use and which will fill a long-felt need for a dish drainer in the home or other institutions.

With the above principal, and other objects, in view the invention has relation to a certain combination and arrangement of parts, an example of which is described in the following specification, pointed out in the appended claims, and illustrated in the accompanying drawings, wherein:

Figure 1:
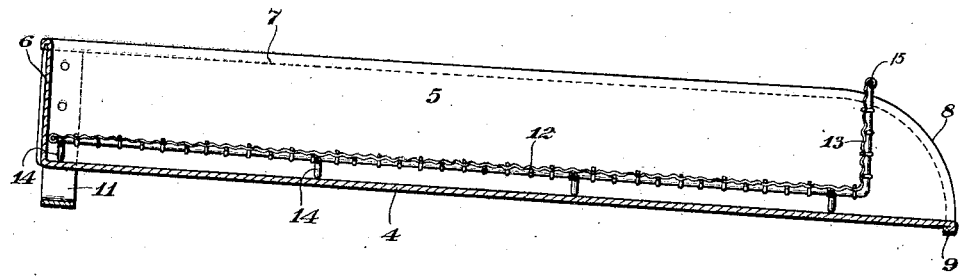
Figure 1 shows a longitudinal sectional view of the dish drainer.
Figure 2:
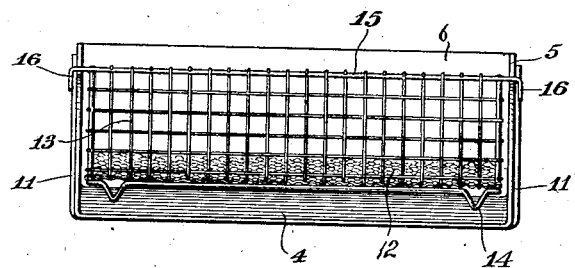
Figure 2 shows a front view of the dish drainer.
Figure 3:
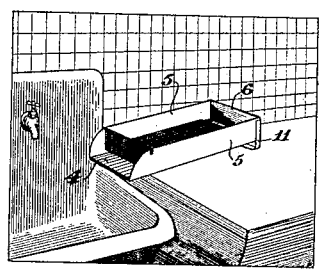
Figure 3 shows a perspective view of the dish drainer placed in position for use.

The accompanying drawings illustrate a practical example or embodiment of the dish drainer, and show a dish container comprising a bottom 4 with integrally formed side walls 5 and a rear wall 6. The upper edge is turned over in the form of a bead 7 to form a finishing rim upon the upper edge of the dish container. The forward ends of the walls 5 are finished on a curve or rounded off to impart symmetry and refinement in design and construction. The bead 7 is continued along the perimeter of the wall 5 and merges with the bottom 4, and at this point the bottom 4 is turned under in the form of a bead 9 to impart strength and rigidity to the sheet metal dish container. The dish container, therefore, comprises a dish holding pan with bottom sides and rear wall, but with the front end thereof formed open. The container will be manufactured of suitable sheet metal and preferably painted white or given any other suitable finish. A supporting leg comprising upstanding members 11 is riveted or otherwise securely attached to the back end of the dish container. The supporting legs are formed from a single piece of stock material bent in the form of a yoke such that the bottom portion will rest in position on a table or shelf and the upstanding ends 11 be riveted to the walls of the container.

A dish supporting rack is placed inside of the dish container. This member comprises a flat sheet of gauze material 12 turned upwardly at the front end thereof as indicated by the numeral 13. The gauze is reinforced by spacer rods 14 which are fixed to the gauze material regular intervals and spaced sufficiently together to adequately support a considerable weight or load of dishes placed upon the upper portion of the gauze rack. The spacer rods act as legs to support the dish rack in a spaced relation above the floor 4. The forwardly upturned end 13 of the dish rack is provided with an upper finishing rod 15 to which is attached and soldered the upper edge of the gauze 13. This rod 15 extends beyond the wall 5 and turns down in the form of a hook 16. This hook acts to hold the dish support rack in proper position within the container by its engagement with the side wall of the container, and it is obvious that by thus providing for engagement of the rack with the side walls of the container I am enabled to support the rack in connection with the container without special connecting means on the latter for this purpose. I am also enabled to support the rack in place by means which leave the side walls of the container with flat unbroken surfaces so that a highly sanitary condition may be maintained at all times by virtue of the ease with which the container may be effectively cleansed.

In use the device is mounted on a table or shelf with the lower end overhanging the shelf into a water sink or receiving receptacle. The dishes to be drained are placed upon the wire gauze rack which thoroughly drains the dishes by permitting the water to trickle therefrom downwardly on the bottom 4 which in turn passes the water to a sink. The upturned end 13 of the support rack holds the dishes in the container. The support legs 11 provide sufficient incline to the container to drain the water therefrom. The support rack can be quickly removed from the container and the parts washed separately.

This form of dish drainer will adequately fill a long-felt want for a household and hotel utility device to be employed for draining dishes prior to the drying process.

Having thus described my invention, what I claim as new, and desire to secure by Letters Patent is:

1. A dish drainer consisting mainly of a pan having sides and open at one end and closed at the other and having a floor sloping down towards its open end, and a detachable grid in the bottom of said pan, and provided with feet to rest upon the pan, said grid having one end turned up to cooperate with the sides of the pan to confine the dishes, said turned-up end having hooks releasably caught upon the sides of the pan.

2. A dish drainer including a pan having one end closed and the other end open, and provided with an inclined floor and having sides for supporting and confining the dishes, and also including a grid bent or turned upwardly near the open end of the pan to retain the dishes, said pan having at its open end a discharge lip extending beyond said grid.

3. A dish drainer including a pan having one end closed and the other end open, and provided with an inclined floor and having sides for supporting and confining the dishes, and also including a grid bent or turned upwardly near the open end of the pan to retain the dishes, said pan having at its open end a discharge lip extending beyond said grid, said bent-up portion of the grid having hooks engaging the sides of the pan to hold the grid detachably in the pan.

4. A dish drainer pan having only one end, two sides and a bottom, the other end being left open, and a grid having only a bottom and one turned up end adapted to snugly fit in said pan with the turned up end of the grid in the open end of the pan.

5. A dish drainer including a pan having one end closed and the other end open, and provided with an inclined floor and having sides for supporting and confining the dishes, and also including a grid bent or turned upwardly near the open end of the pan to retain the dishes, said pan having at its open end a discharge lip extending beyond said grid, said bent-up portion of the grid having hooks engaging the sides of the pan to hold the grid detachably in the pan, said grid consisting of open-meshed wire fabric provided with reinforcing rods, said rods bent to form supporting legs for the grid.

6. A dish-drainer pan having integral bent-up sides and end, one end of said drainer pan being open, said drainer pan inclined downwardly toward the open end, a grid in said drainer pan, means supporting the grid above the bottom of the pan, said grid upturned at the open end of the drainer pan to retain the dishes, and means for preventing the grid from slipping out of the open end of the pan.

7. A dish drainer comprising a pan having one end closed and the other end open, and provided with an inclined floor and having sides for supporting and confining the dishes, and also comprising a grid bent or turned upwardly near the open end of the pan to retain the dishes, said upturned end having a transverse rod, and hooks formed on the ends of the rod to clasp the sides of the pan.

8. As a new article of manufacture, a detachable grid to cooperate with a dish-draining pan, said grid provided with means to support it, and having one end upturned to confine the dishes therein, said upturned end having at its sides hooks to clasp the sides of the pan.

9. A tilted dish-drainer pan having a flat bottom with integral sides and having a discharge end and an integral rear end, a detachable grid extending from said rear end to the discharge end of the drainer pan, said grid having an upturned end to confine the dishes, and said drainer pan having a lip projecting beyond said detachable grid, and means for preventing the grid from slipping out of the discharge end of the pan.

10. A tilted dish-drainer pan having a flat bottom with integral sides and an integral rear end, and also having a discharge end, and a grid extending from said rear end to the discharge end of the drainer pan, said grid having an upturned end to confine the dishes, means being provided upon the upturned portion of the grid to detachably engage the sides of the drainer pan and retain the grid therein.

11. The combination of a dish-draining pan having dish-supporting sides and one closed end and open at the other end, and inclined downwardly from its closed end to its open end, and a grid provided on its under side with projections to support it upon the floor of said pan at the bottom portion thereof, said grid having near the open end of the pan an upturned end to cooperate with the sides of the pan to support and confine the dishes, and means for preventing the grid from slipping out of the open end of the pan.

RICHARD M. SMYTHE.